US007644211B2

(12) United States Patent
Toebes et al.

(10) Patent No.: US 7,644,211 B2
(45) Date of Patent: Jan. 5, 2010

(54) METHOD AND SYSTEM FOR CONTROLLING TRANSMISSION OF USB MESSAGES OVER A DATA NETWORK BETWEEN A USB DEVICE AND A PLURALITY OF HOST COMPUTERS

(75) Inventors: John Toebes, Cary, NC (US); Arthur Howarth, San Jose, CA (US); Mickey Sartin, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 11/006,989

(22) Filed: Dec. 7, 2004

(65) Prior Publication Data

US 2006/0123166 A1 Jun. 8, 2006

(51) Int. Cl.
*G06F 13/42* (2006.01)
(52) U.S. Cl. ............... 710/106; 710/305; 710/306; 710/308; 370/402; 370/466
(58) Field of Classification Search ............... 710/200, 710/315, 37, 305, 241, 106–108, 316; 370/254, 370/402, 466, 474
See application file for complete search history.

(56) References Cited

U.S. PATENT DOCUMENTS

| 4,135,240 A | * | 1/1979 | Ritchie ................ 711/164 |
| 4,835,737 A | * | 5/1989 | Herrig et al. ............ 710/302 |
| 5,408,627 A | * | 4/1995 | Stirk et al. ............. 711/151 |
| 5,416,910 A | * | 5/1995 | Moyer et al. ............ 710/113 |
| 5,586,033 A | * | 12/1996 | Hall ..................... 701/50 |
| 5,655,151 A | * | 8/1997 | Bowes et al. ............ 710/22 |
| 5,719,961 A | * | 2/1998 | Normile et al. .......... 382/239 |
| 5,784,393 A | * | 7/1998 | Byers et al. ............. 714/800 |
| 6,061,746 A | * | 5/2000 | Stanley et al. ........... 710/10 |
| 6,141,719 A | * | 10/2000 | Rafferty et al. .......... 710/316 |
| 6,182,167 B1 | * | 1/2001 | Basham et al. ........... 710/38 |
| 6,308,239 B1 | * | 10/2001 | Osakada et al. .......... 710/316 |

(Continued)

OTHER PUBLICATIONS

Compaq et al. Universal Serial Bus Specification. Apr. 27, 2000. Revision 2.0.*

(Continued)

*Primary Examiner*—Mark Rinehart
*Assistant Examiner*—Matthew D Spittle
(74) *Attorney, Agent, or Firm*—Weaver Austin Villeneuve Austin LLP

(57) ABSTRACT

A solution is provided for controlling universal serial bus (USB) messages between a plurality of host computers and a USB device. First and second USB servers may communicate with first and second host computers, respectively. A USB client may then communicate with the USB device. A first control path between the USB client and the first USB server and a second control path between the USB client and the second USB server may be established. Then a first data transfer path may be established between the USB client and the first USB server, the first data transfer path enabling the sending of data between the USB client and the first USB server over a data network. Then a busy message may be sent from the USB client to the second USB server over the second control path when the first data transfer path is established with the first USB server.

35 Claims, 12 Drawing Sheets

U.S. PATENT DOCUMENTS

| | | | | |
|---|---|---|---|---|
| 6,334,121 | B1* | 12/2001 | Primeaux et al. | 706/62 |
| 6,369,909 | B1* | 4/2002 | Shima | 358/1.15 |
| 6,381,666 | B1* | 4/2002 | Kejser et al. | 710/300 |
| 6,389,029 | B1* | 5/2002 | McAlear | 370/402 |
| 6,546,450 | B1* | 4/2003 | Liu | 710/316 |
| 6,549,966 | B1* | 4/2003 | Dickens et al. | 710/300 |
| 6,600,739 | B1* | 7/2003 | Evans et al. | 370/362 |
| 6,904,489 | B2* | 6/2005 | Zarns | 710/315 |
| 6,934,793 | B2* | 8/2005 | Ying et al. | 710/316 |
| 7,047,344 | B2* | 5/2006 | Lou et al. | 710/305 |
| 7,069,373 | B2* | 6/2006 | Teng | 710/310 |
| 7,412,621 | B2* | 8/2008 | Choi | 714/10 |
| 2003/0074431 | A1* | 4/2003 | Abbondanzio et al. | 709/221 |
| 2004/0095888 | A1* | 5/2004 | Noel, Jr. | 370/238 |
| 2005/0027889 | A1* | 2/2005 | Sandulescu | 709/250 |
| 2005/0135422 | A1* | 6/2005 | Yeh | 370/474 |
| 2005/0265385 | A1* | 12/2005 | Cromer et al. | 370/466 |
| 2006/0069543 | A1* | 3/2006 | Sajwani et al. | 703/24 |
| 2006/0123129 | A1 | 6/2006 | Toebes et al. | 709/230 |

OTHER PUBLICATIONS

Byard, Larry F. Dux Computer Works. FAQs: Mac Address. Feb. 2, 2002. http://www.duxcw.com/faq/network/mac.htm.*

PCI Special Interest Group. PCI Local Bus Specification. Jun. 1, 1995.*

Inside Out Networks. AnywhereUSB. Product Data Sheet. 2005.*

Greenberg et al. IP-Over-USB Gateway. Final Project Report. Apr. 15, 2005.*

D-Link. DNS-120. Express EtherNetwork USB to Ethernet Network Storage Adapter. datasheet. 2005.*

SIIG Inc. USB Over IP. User's Manual. Jun. 2008.*

*Digi 5-Port USB AnyWhere Remote USB Over IP Extender*, KVMs.com web page http://www.kvms.com/nav/item.asp?item=8221, printed Oct. 14, 2004.

*Inside Out Networks—the Leader in Enterprise USB Connectivity Products*, Inside Out Networks web page http://www.ionetworks.com/products/index.jsp, printed Oct. 14, 2004.

*USB Over IP: Turning Your Network Into an I/O Bus, White Paper*, www.ionetworks.com, © 2003-2004 Digi International Inc. 91001239 A1/0204, 3 pages.

*AnywhereUSB®*, Inside Out Networks—the Leader in Enterprise USB Connectivity Products web page http://www.ionetworks.com/products/usboverip/index.jsp, printed Oct. 14, 2004.

*MIMIO by Virtual Ink*, Copyright © 2004, Virtual Ink Corporation web page http://www.mimio.com/, printed Oct. 14, 2004.

USPTO Office Action issued in related U.S. Appl. No. 11/006,988 dated Jun. 12, 2008 (22 pages).

* cited by examiner

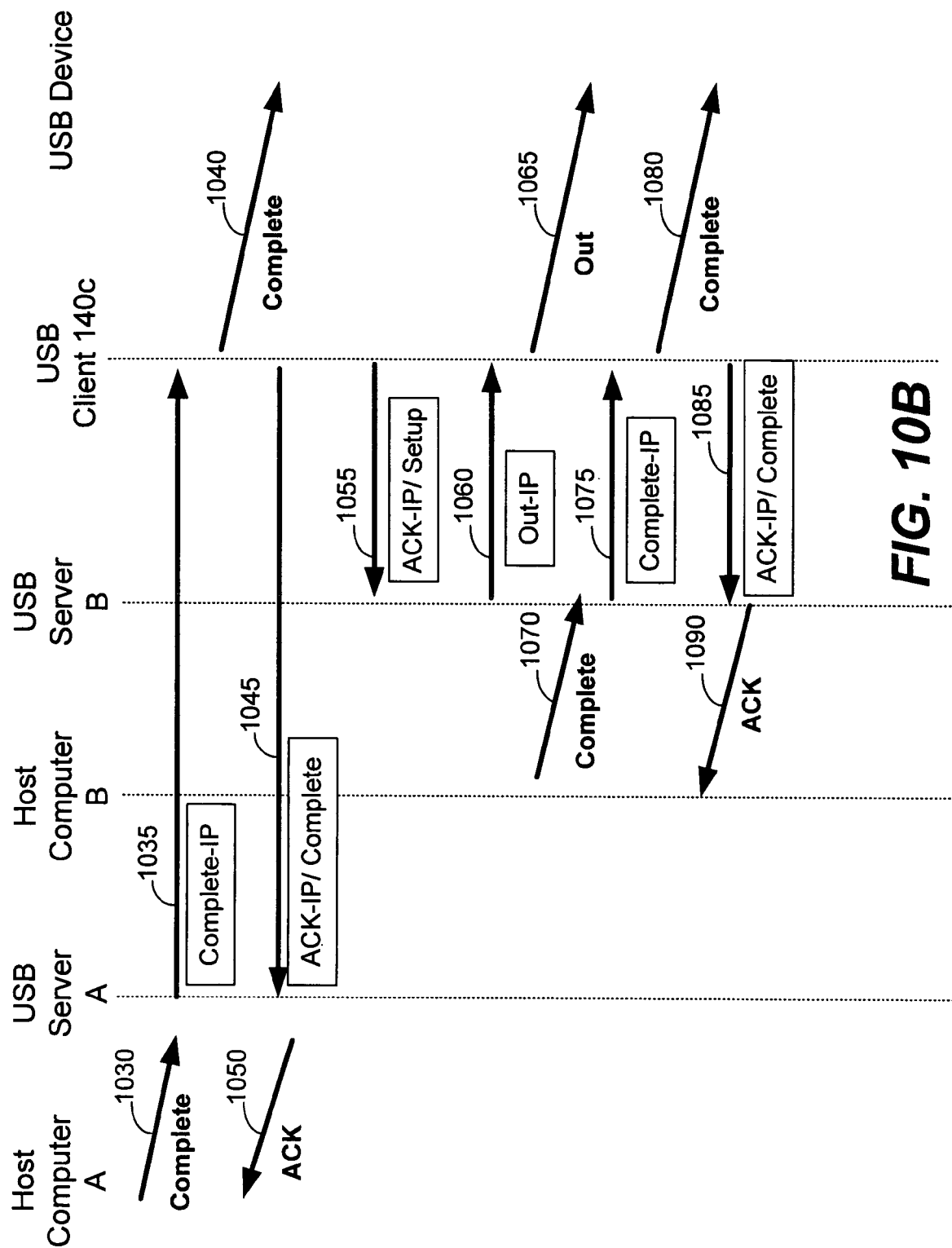

METHOD AND SYSTEM FOR CONTROLLING TRANSMISSION OF USB MESSAGES OVER A DATA NETWORK BETWEEN A USB DEVICE AND A PLURALITY OF HOST COMPUTERS

CROSS-REFERENCE TO RELATED APPLICATION

The present application relates to commonly assigned, copending U.S. Patent Application, filed concurrently herewith, for METHOD AND SYSTEM FOR SENDING AND RECEIVING USB MESSAGES OVER A DATA NETWORK Ser. No. 11/006,988. The disclosure of the above-listed application is incorporated herein by reference in its entirety for all purposes.

BACKGROUND OF THE INVENTION

1. Field of the Invention

The present invention relates generally to transmission of USB messages. More particularly, the present invention relates to controlling the transmission of USB messages over a data network between a USB device and a plurality of host computers.

2. Description of the Related Art

Universal Serial Bus ("USB") has become a standard for connecting peripherals to computers. Most computers have USB ports allowing the connection of USB-enabled peripherals such as mice, keyboards, printers, scanners, digital cameras, webcams, modems, speakers, telephones, storage devices, flash card readers, network interfaces, and other devices. One benefit of USB is that any USB-enabled device ("USB device") can be connected to its host computer using the same, standardized USB connection.

Regardless of the particular USB device, the USB device can be plugged into the host computer simply by connecting a USB cable between the device and the host computer. When the USB device is connected, the operating system of the host computer can often automatically detect it. Driver software can be easily installed on the host computer to interact with the USB device.

For host computers with fewer USB ports than desired USB devices, a USB hub can be connected to provide additional USB connections. Conventional USB hubs, such as a 4-port hub, can be plugged into the USB port on the host computer, enabling the connection of 4 USB devices to the single USB host port. USB hubs can be chained together to provide additional USB ports as desired and share the bandwidth available on the root port.

There are generally four types or modes of data transfer that can occur between the USB device and the computer: (1) Control, (2) Interrupt, (3) Bulk and (4) Isochronous. Control mode is used to enumerate (identify) a device and is often used for out of band device control such as accessing control registers on the device. Interrupt mode can be used for a device such as a mouse or keyboard that sends data at a lower bandwidth and speed. Bulk mode is used for devices such as printers which receive data in larger packets. In one example, a block of data is sent to the printer in 64-byte packets. Isochronous mode is used for streaming devices such as speakers. Data streams between the USB device and the computer.

A USB cable connects a USB device and host computer in a point-to-point manner. The USB cable limits the physical distance and connectivity between a USB device and the host. Individual USB cables are generally manufactured in lengths on the order of several meters. With USB hubs, USB devices can be connected to a host computer up to about 30 meters away from the host. However, the distance between the USB device and the host it communicates with is still limited to the physical distance of the USB cables and hubs.

Because of the physical limitation of the USB cable, attempts to connect USB devices remotely with respect to a host have been problematic. One example of a USB device which has not been effectively connected to the host as a remote device is a USB-enabled multi-function printer. Print servers exist that use an LPR protocol and provide an Ethernet connection to the printer. However, many print servers preclude the bi-directional protocol of the multi-function printer. The print server only provides the print function of the printer and eliminates the enhanced functions of the printer. Also, when the host computer is connected by virtual private network (VPN) in a corporate environment, the Ethernet enabled printer is not available to print from the host computer. In the past, the only way to access the multiple functions of the printer was to disconnect the printer from the VPN and connect the printer to the host computer by a USB cable. Then, to access the printer via the VPN, the printer had to be disconnected from USB and re-connected to the VPN.

With the advent of multiple hosts, it is desirable to share common peripherals. However, an additional limitation of USB is the inability to share USB devices among two or more hosts. Conventional techniques for connecting USB devices to hosts have only provided for one-to-one connections: one USB device to one host. Logical sharing of USB devices among two or more hosts has not been possible. The only way to arguably share a USB device has been is in the physical sense—the USB cable connecting the USB device to a first host is physically unplugged from the first host, moved into the necessary proximity with a second host, and then plugged into the second host.

What is needed is a scheme for eliminating the physical distance limitation of USB, enabling the remote connection and communication of a USB device with a host, and enabling the sharing of a USB device or devices by multiple hosts.

SUMMARY OF THE INVENTION

Aspects of the present invention relate to methods, computer program products, apparatus, and systems for controlling sending and receiving of universal serial bus ("USB") messages between a plurality of host computers and a USB device over a data network. A first USB server is in communication with a first one of the host computers and the data network. A second USB server is in communication with a second one of the host computers and the data network. A USB client is in communication with the data network and the USB device. A first control path is established between the USB client and the first USB server, and a second control path is established between the USB client and the second USB server. A data transfer path is established between the USB client and the first USB server. The data transfer path enables sending of data between the USB client and the first USB server over the data network. A busy message is sent from the USB client to the second USB server over the second control path when the data transfer path is established with the first USB server.

BRIEF DESCRIPTION OF THE DRAWINGS

FIGS. 10A and 10B show a flow diagram of a method 1000 for controlling the sending and receiving of USB messages between a plurality of host computers and a USB device over a data network, according to one embodiment of the present invention.

DETAILED DESCRIPTION OF THE INVENTION

Embodiments of the present invention enables remote connectivity of USB devices to a host computer or other data processing apparatus, regardless of the operating system on the computer, and regardless of the type of USB device (e.g., camera, printer, keyboard, flash card reader, media player). This host computer or apparatus has full access to a plurality of USB devices served on a data network. One embodiment of methods and apparatus of the present invention provides for a split software spoofing technique to implement a USB ("Universal Serial Bus") system over a data network. The spoofing technique, described below, enables the USB system to appear to include a physical USB connection between a host computer and a USB device, when in fact the USB device is remotely connected to the host computer over the data network. Thus, the physical USB cable requirement and distance limitation associated with conventional USB cables can be eliminated.

One embodiment of methods and apparatus of the present invention further provides for the sharing of hosts or host computers by a remotely connected USB device. In some implementations, bulky or seldom used USB devices can be physically located in designated areas, and connected remotely to one or more host computers over the data network. The terms "host computer" and "host" are used interchangeably herein, generally referring to a computer or other data processing apparatus capable of interacting with a USB server using the methods and apparatus described below.

Figure 1:
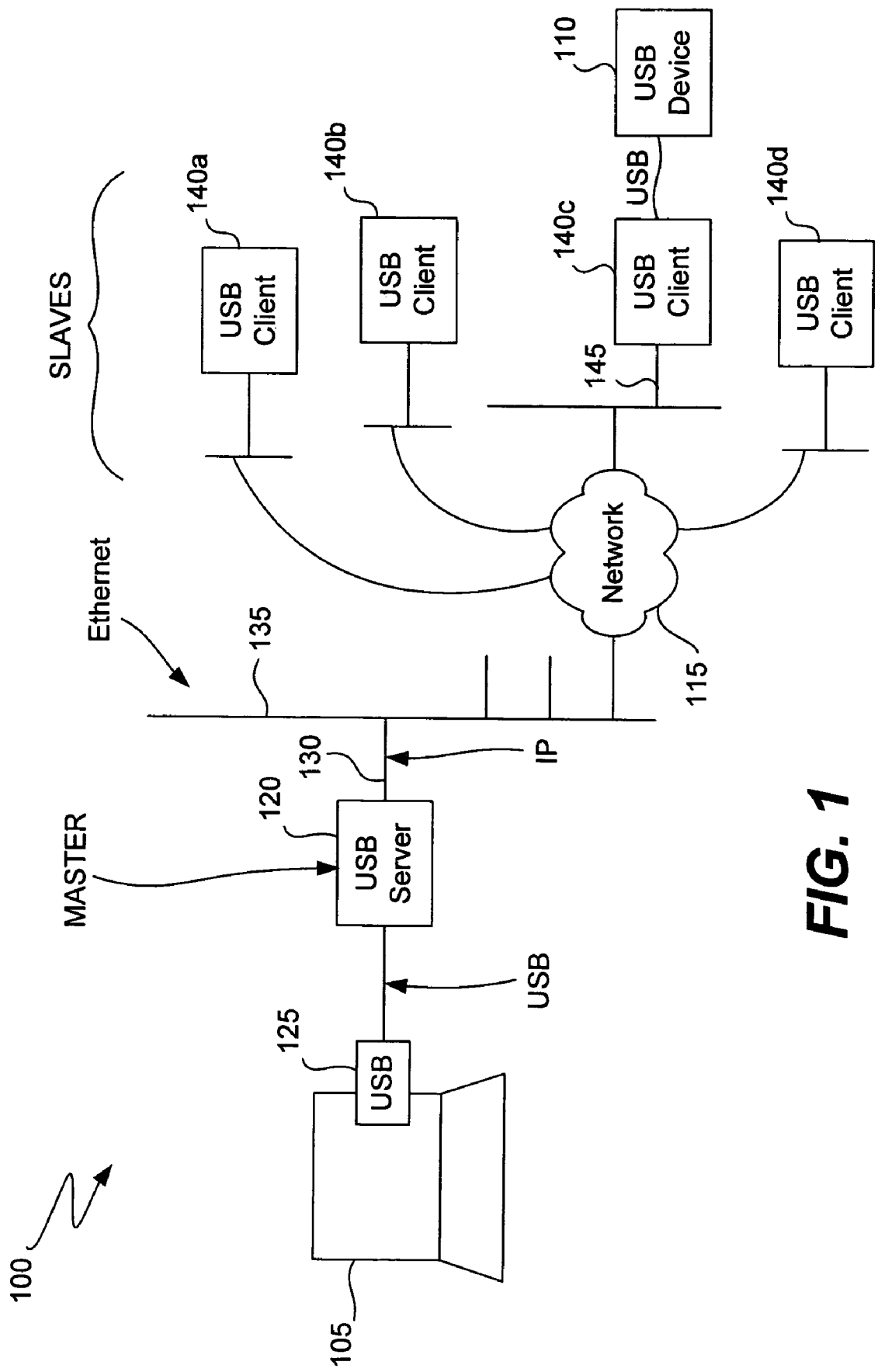
FIG. 1 shows a block diagram of a system 100 for sending and receiving Universal serial bus ("USB") messages between a host computer and a USB device over a data network, where the USB server is an external device, according to one embodiment of the present invention.

FIG. 1 shows a system 100 for sending and receiving USB messages between a host, in this case computer 105, and a USB device 110 over a data network 115, according to one embodiment of the present invention. In the system 100 of FIG. 1, the host computer 105 can be a personal computer, workstation or any other data processing apparatus, depending on the desired implementation. The USB device 110 is any device such as a peripheral that communicates using the USB protocol. Examples of USB device 110 include printers, scanners, mice, keyboards, cameras, webcams, multifunction printers, flashcard readers, hard drives, flash drives, and various media players. In FIG. 1, the data network 115 is any network or combination of networks capable of passing data between elements connected to the data network 115 at network addresses on the data network 115. Examples of data network 115 include any wired network, wireless network, layer 1, layer 2, layer 3 networks, the Internet, an intranet, an extranet, local area network ("LAN"), wide area network ("WAN"), and any combination thereof.

In FIG. 1, system 100 further includes a USB server 120 in communication with host computer 105 and data network 115. The USB server 120 provides translation of messages in a USB protocol to and from network messages, that is, messages formatted in a suitable network protocol for passing over data network 115. In one embodiment, as shown in FIG. 1, USB server 120 includes two physical connections. The USB server 120 connects to host computer 105 through a USB port 125 in or connected to the host computer 105. The USB port 125 is a conventional USB port which interacts with conventional USB driver software in the host computer 105. The USB server 120 and host computer 105 send USB messages, that is, messages formatted in the USB protocol, between one another through USB port 125. A second physical connection of USB server 120 is a network connection 130 for sending network messages to and from data network 115. In one embodiment, as shown in FIG. 1, the network connection 130 provides an internet protocol ("IP") endpoint or node for USB server 120 on data network 115. In one example, as shown in FIG. 1, the network connection 130 includes an Ethernet port which interfaces with Ethernet 135. For purposes of illustration, in FIG. 1, Ethernet 135 is shown separate from data network 115. Those skilled in the art will appreciate that Ethernet 135 can be provided as part of data network 115.

In FIG. 1, the system 100 includes a plurality of USB clients 140a-140d. Each USB client 140a-140d is capable of servicing an associated USB device. For instance, in FIG. 1, USB client 140c is in communication with USB device 110. Each USB client also interfaces with data network 115 over a suitable network connection for communicating messages between data network 115 and a USB device in communication with that USB client. USB client 140c generally has two connections: a USB connection, and a network connection 145. USB client 140c connects to USB device 110 through a USB port. USB client 140c connects to data network 115 through the network connection 145 such as an Ethernet port, similar to USB server 120. The network connection 130 for USB server 120, and the network connection 145 for USB client 140c can be any suitable connection, including LAN/WAN, wireless, wired, and even powerline. USB client 140c provides translation of USB messages to and from network messages and sending such messages between data network 115 and USB device 110. These functions and additional functions of USB clients are described below.

In FIG. 1, using techniques described below, USB server 120 appears to host computer 105 as a conventional N-port USB hub. USB Server 120 emulates the interaction of the conventional USB hub with host computer 105. Conventional USB hub software provided on host computer 105 supports USB protocol and interacts with USB server 120 as if USB server 120 is a conventional USB hub. No additional software or hardware is needed for host computer 105 to interact with USB server 120. Similarly, each USB client 140a-140d can interface with a USB device such as device 110 using a conventional USB port. The USB client 140c appears to USB device 110 as one output or output port of a conventional USB hub. No additional software or hardware is required for USB device 110 to interact with USB client 140c.

In FIG. 1, the plurality of USB clients 140a-140d are associated with the single USB server 120. In another embodiment of the present invention, there are a plurality of host computers such as host computer 105, and a plurality of USB servers such as USB server 120. Each host computer is in communication with a respective one of the USB servers. There are also a plurality of USB devices, such as multi-function printers, each of which has an associated USB client. The USB servers and USB clients are connected to network 115 in the same manner as USB server 120 and USB client 140c, as illustrated in FIG. 1. In this embodiment, any combination of the USB clients can be associated with any combination of the USB servers. For example, ten printers connected to respective USB clients can be associated with a single personal computer (PC). Then a virtual unplug operation, that is, re-association, can be performed so that five of the ten printers are associated with a first PC and USB server pair, and the remaining five printers are associated with a second PC and second USB server. This virtual unplug operation can be performed dynamically so that any one of the USB clients can be re-associated with any one of the USB servers. When such a re-association is performed, the computer 105 receives a "connect" and "disconnect" message from the USB server 120 as if the USB devices were physically plugged or unplugged into the USB port 125.

In one embodiment of the system 100 of FIG. 1, USB server 120 generally does not need a power supply independent of that provided by USB port 125. That is, the host computer 105 can power USB server 120 through the USB port 125. In one embodiment, as the host computer 105 is powering the USB server, the host computer 105 will limit the power it serves through the USB server to the USB devices (100 mA). In another embodiment, the USB server is self powered allowing the USB Device 110 the full amount of power available on a hub port (500 mA). In a third embodiment, the USB server manipulates the USB device 110's power requirement messages to state the device is fully self powered and needs no power through the bus.

Embodiments of the present invention provide for different implementations of USB server 120 and USB clients such as USB client 140c. In one embodiment, as shown in FIG. 1, USB server 120 is external to host computer 105. In this embodiment, USB server 120 includes software configured to provide the functions described below, and hardware needed to carry out these functions and to provide physical connections to host computer 105 and data network 115. Similarly, in the embodiment shown in FIG. 1, USB client 140c is situated external to USB device 110 and incorporates software and hardware to provide the functions of USB client 140c and the necessary physical connections to data network 115 and USB device 110.

Figure 2:
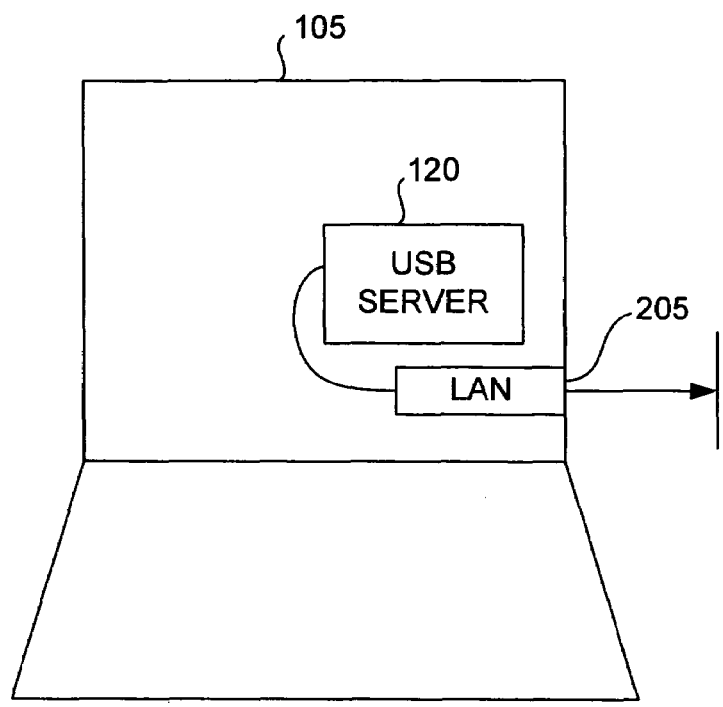
FIG. 2 shows an illustration of a host computer 105 in which a USB server is situated, according to one embodiment of the present invention.

In an alternative embodiment shown in FIG. 2, USB server 120 is situated within host computer 105. In this embodiment, USB server 120 connects to a network interface 205 provided within host computer 105 for connecting to data network 115. Thus, in the embodiment of FIG. 2, USB server 120 does not need its own external physical connection for connecting to data network 115. In the embodiment of FIG. 2, USB server 120 can be implemented primarily in software to perform the same functions provided by USB server 120 in FIG. 1.

Figure 3:
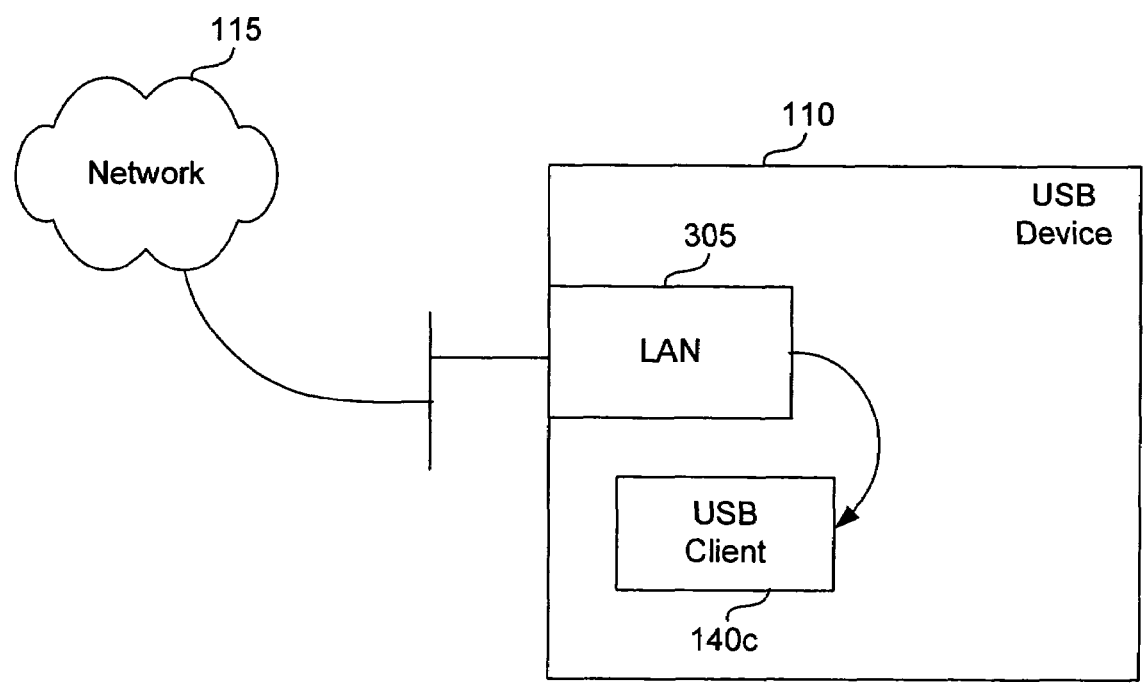
FIG. 3 shows an illustration of a USB device 110 in which a USB client is situated, according to one embodiment of the present invention.

FIG. 3 shows an alternative implementation of USB client 140c to that shown in the system 100 of FIG. 1. In FIG. 3, similar to the implementation of USB server 120 in FIG. 2, USB client 140c is situated within USB device 110. USB client 140c communicates with data network 115 through a network interface 305 provided by USB device 305. Thus, as with USB server 120 in FIG. 2, USB client 140c does not require its own external physical connection to data network 115. USB client 140c essentially piggybacks on the functionality provided by network interface 305 to interact with data network 115. In the embodiment of FIG. 3, USB client 140c can be implemented primarily in software on the USB device 110. This software implementation can be beneficial in circumstances where there are size and space constraints on USB client 140c.

In FIGS. 2 and 3, because USB server 120 and USB client 140c are implemented primarily in software, on the respective host computer 105 and USB device 110, the USB server 120 and USB client 140c can be characterized as "logical" or "virtual" implementations. On the other hand, in one implementation of the embodiment shown in FIG. 1, the USB server 120 and USB client 140d include hardware to carry out the respective functions and provide the necessary physical connections for USB server 120 and USB client 140d. In this predominantly hardware implementation, USB server 120 and USB client 140d can be characterized as "physical" devices. The virtual implementation is more cost effective and raises the shareable bus bandwidth when the physical medium's (e.g. Gigabit Ethernet) bandwidth is greater than the USB bus. The physical implementation provides host computer 105 operating system independence and USB client 140d compatibility to various USB devices.

Figure 4A:
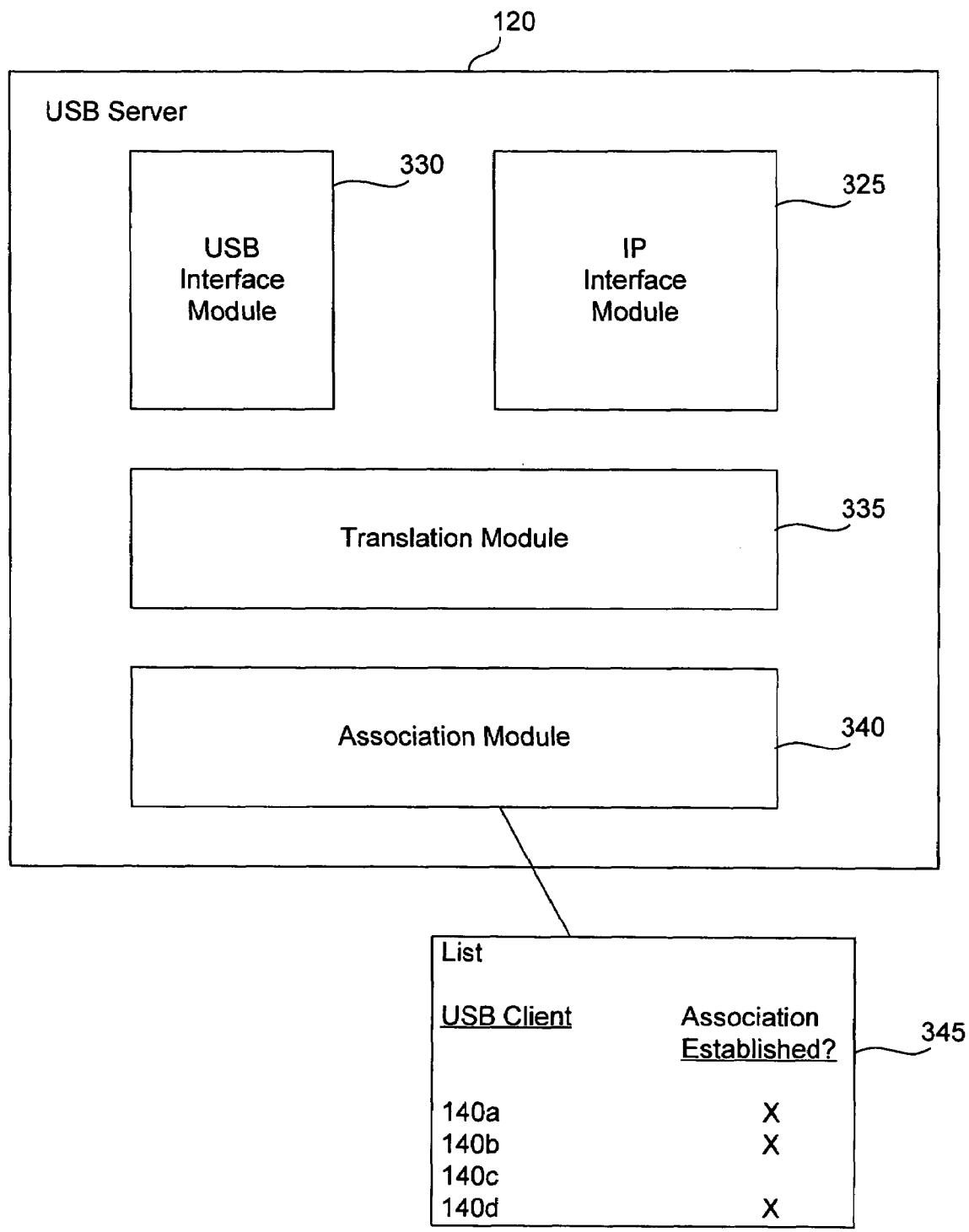
FIG. 4A shows a block diagram of a USB server 120, in accordance with one embodiment of the present invention.

FIG. 4A shows a block diagram of a USB server 120, in accordance with one embodiment of the present invention. The USB server 120 includes apparatus to generally perform at least four functions. First, the USB server 120 includes an IP interface module 325 which enables USB server 120 to be an IP client of data network 115. The IP interface module 325 provides an IP address for USB server 120 so that USB server 120 can send and receive messages as IP packets or other formats suitable for sending over data network 115. The IP connection established between IP interface module 325 and data network 115 can be established with any suitable form of wired or wireless IP connectivity such as RG-45, power line, 802.11 in all forms, and conventional Ethernet connectivity.

Secondly, in FIG. 4A, USB server 120 further includes a USB interface module 330 which interfaces and interacts with host computer 105 through USB port 125, providing the USB hub emulation described above. USB interface module 330 is configured to implement the appropriate USB hub device protocol capabilities. The third function of USB server 120 is a implemented in a translation module 335 which, in one embodiment, provides USB over IP protocol. The translation module 335 is generally configured to translate USB messages to network messages (e.g., IP packets) for sending USB messages received from host computer 105 as network messages over data network 115, as explained below. Similarly, translation module 335 is configured to translate network messages received from data network 115 to USB format for delivery to host computer 105 through USB port 125.

Fourth, in FIG. 4A, the USB server 120 includes an association module 340 configured to establish and maintain an association between the USB server 120 and zero or more USB clients. Association module 340 can establish the associations using a table, TCP sockets, a web interface provided to a user of host computer 105 allowing the user to select clients to associate with, and other techniques. In one embodiment, association module 340 manages the associations between the USB server 120 and corresponding USB clients in the form of a list 345 stored in memory or a processor readable storage medium accessible by association module 340. The associations can be established during power-on, using data stored in flash memory, dynamically by discovery mechanisms to identify USB servers on the network 115, using configurations managed by the user, using a token scheme, or with any other mechanism using an agreed-upon sequence of events.

Figure 4B:
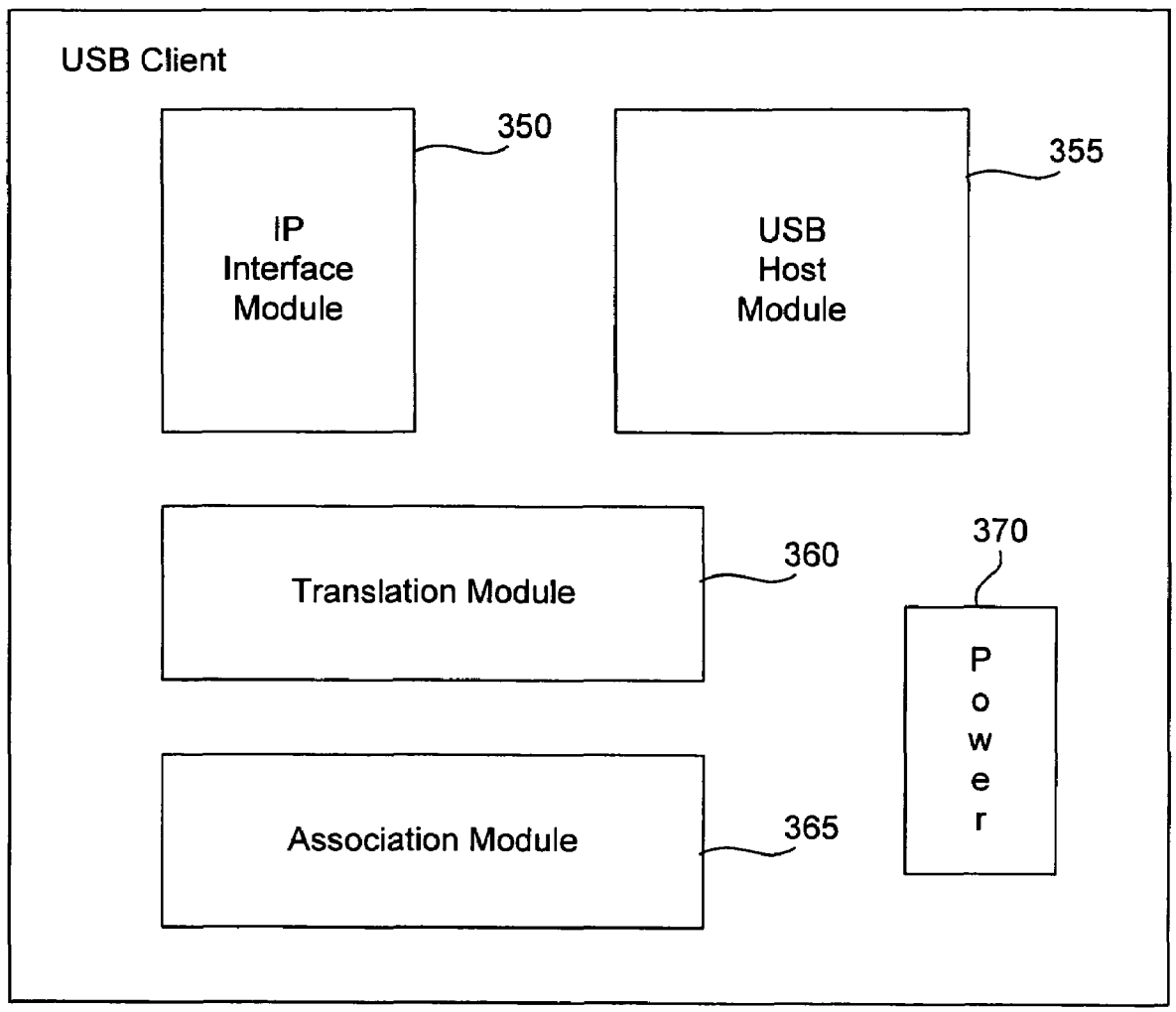
FIG. 4B shows a block diagram of a USB client, in accordance with one embodiment of the present invention.

FIG. 4B shows a block diagram of a USB client, in accordance with one embodiment of the present invention. The USB client has similar functionality as USB server 120. For instance, the USB client includes an IP interface module 350, providing the same functionality that IP interface module 325 provides for USB server 120. A USB host module 355 interfaces and interacts with a USB device 110, using USB protocol. The USB host module 355 implements the "host" side of USB protocol. Thus, the USB host module 355 can recognize USB devices when those devices are connected to the USB client. The USB host module 355 can send interrogation messages to the USB device to determine attributes of the USB device. Then the USB host module 355 will configure and enable the USB device 110.

In FIG. 4B, the USB client further includes a translation module 360, similar to translation module 335 in USB server 120. Here, the translation module 360 is configured to translate USB messages to network messages (e.g., IP packets) for sending USB messages received from USB device 110 as network messages over data network 115, and translate network messages received from data network 115 to USB format for delivery to USB device 110. In addition, the USB client includes an association module 365 which is generally configured to establish an association with zero or one USB server at a time, such as USB server 120. The association module 365 can select the USB server to associate with using any number of methods, including: (1) broadcast to find the nearest USB server, (2) stored data identifying a particular USB server, (3) a web page or other user interface allowing selection of the USB server, and (4) hardware settings allowing a user to choose the USB server.

In one embodiment, as shown in FIG. 4B, the USB client also includes a power supply 370 which can supply power to the connected USB device. In an alternative embodiment, the USB client does not include power supply 370.

Those skilled in the art will appreciate that the apparatus, modules and functions described above can be implemented with combinations of hardware and software. In one example, the USB server 120 includes a processor and a memory with instructions executable to perform the functions above. Similarly, the USB client can also have a processor and memory for performing its functions. Other hardware and software implementations of the USB server 120 and USB client are possible, as will be understood by those skilled in the art.

The system 100 of FIG. 1 provides for sending and receiving USB messages between host computer 105 and USB devices such as USB device 110. The USB server 120 and USB client 140c cooperate to translate messages between USB protocol or format and a network format suitable for sending over data network 115. The USB server 120 and USB client 140b provide for receiving a USB message at USB client 140c from USB device 110, translating the USB message to packets formatted for sending over the data network 115, that is, a network message. The USB server 120 receives the network message and translates the message back to the original USB format and provides the USB message to host computer 105 over USB port 125. These functionalities of USB client 140c and USB server 120 are reversed when host computer 105 sends a USB message to USB device 110 over data network 115.

Figure 5A:
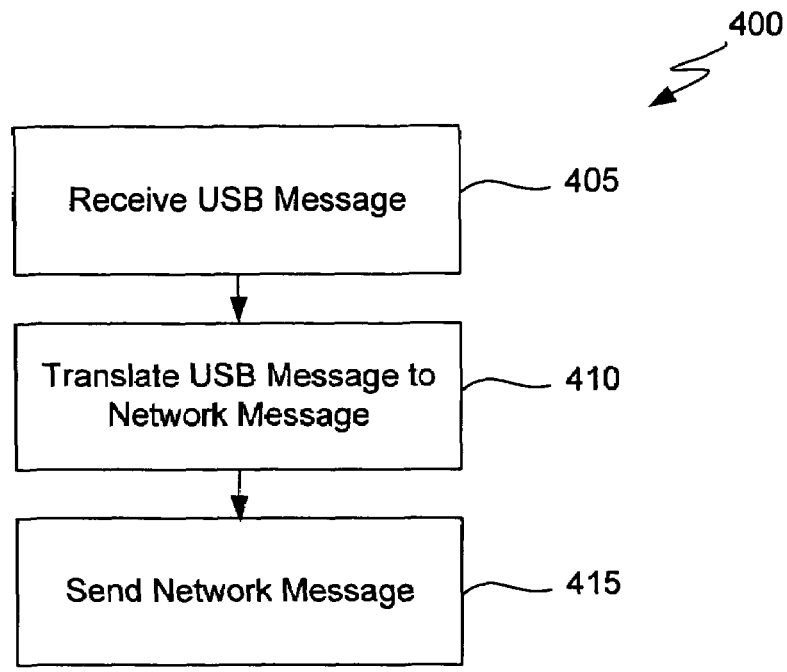
FIG. 5A shows a flow diagram of a method 400 performed by USB server for sending a USB message over a data network, performed in accordance with one embodiment of the present invention.

FIG. 5A shows a method 400 performed by USB server 120 when sending a USB message from host computer 105 to USB client 140c over data network 115. The method 400 is also performed by USB client 140c for sending a USB message originating from USB device 110 to USB server 120 over data network 115.

In FIG. 5A, a USB message is received from the host computer 105 or USB device 110. "USB message" generally refers to a message in the USB protocol. When the USB message is received by the USB server 120 or USB client 140c, in Step 410, the server 120 or client 140c translates the USB message to a network message, that is, a message in a suitable protocol or format for sending over data network 115. Suitable protocols for the network message include layer 2, layer 3, layer 4 and the other protocols appropriate for passing the network message over any of the implementations of data network 115 described above. In one embodiment, the USB message, a layer 2 protocol, is encapsulated in an appropriate higher layer protocol, such as layer 3 or layer 4, during the translation step 410. Such an encapsulation operation is generally known to those skilled in the art. In Step 415, the USB server 120 or USB client 140c sends the network message over data network 115 to the USB client 140c or USB server 120.

Figure 5B:
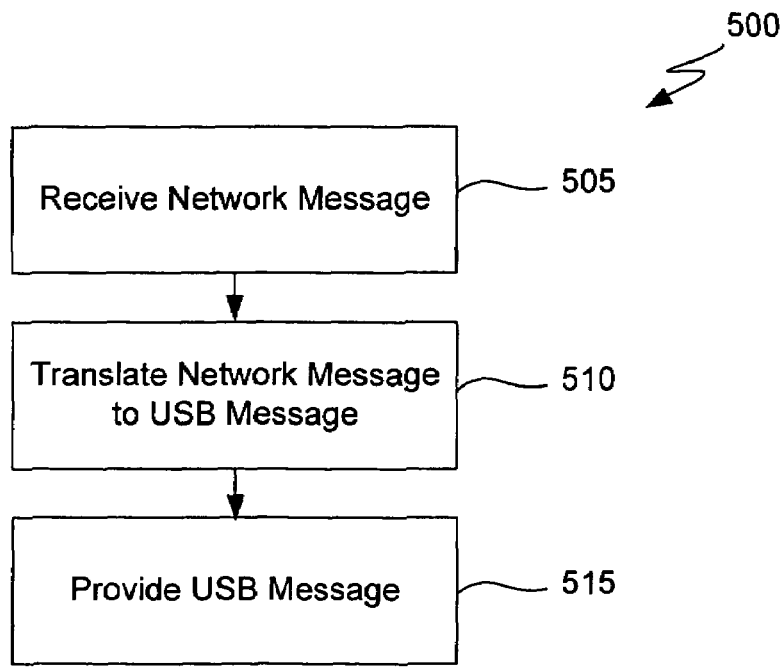
FIG. 5B shows a flow diagram of a method 500 for translating and communicating a network message as a USB message for a connected computer or USB device, performed in accordance with one embodiment of the present invention.

FIG. 5B shows a method 500 performed by USB server 120 or USB client 140c for communicating a network message received over data network 115 to host computer 105 or USB device 110 as a USB message. In Step 505, when the network message is received from data network 115, the USB server 120 or USB client 140c translates the network message back to the USB format. Because the original USB message was encapsulated in the appropriate network protocol, as described above in FIG. 5A, the network message is essentially de-encapsulated back to its original USB protocol. In Step 515, the USB message can then be provided to the host computer 105 or USB device 110 over a USB port or connection, and properly interpreted by the receiving device.

Figure 6:
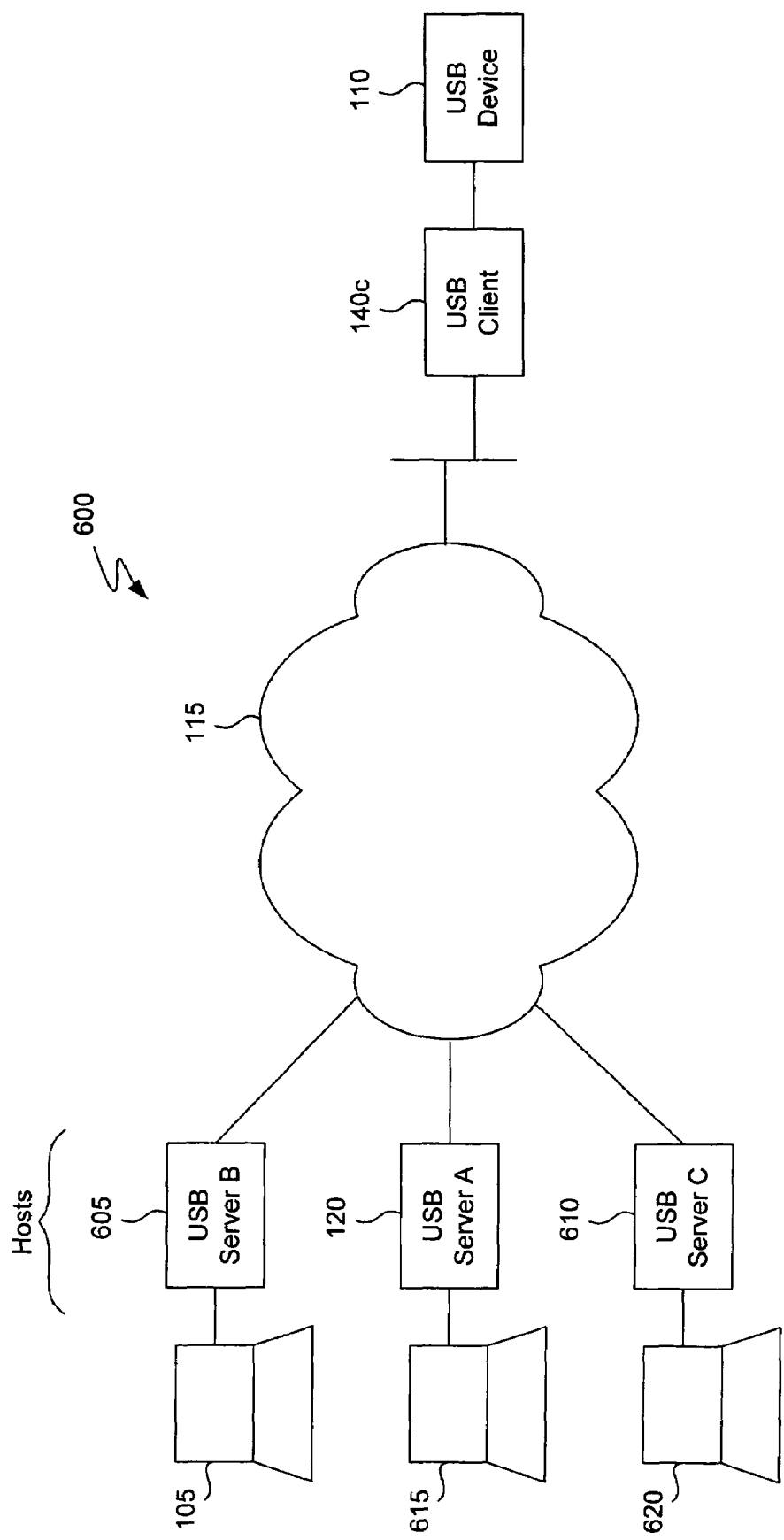
FIG. 6 shows a block diagram 600 of a plurality of USB Servers capable of interfacing with a USB client over a data network, according to one embodiment of the present invention.

FIG. 6 shows a block diagram of USB server 120 and USB client 140c in communication with data network 115, according to one embodiment of the present invention. In addition, system 600 includes USB server 605 connected between data network 115 and a second host computer 615, and USB server 610 connected between data network 115 and a third host computer 620. In the embodiment shown in FIG. 6, USB client 140c is capable of servicing the various USB servers 120, 605, 610. In one embodiment, USB client 140c generally maintains a one-to-one relationship with its corresponding USB server. For instance, in FIG. 1, USB client 140c has a one-to-one relationship with USB server 120. That is, the USB client 140c associates with the single USB server 120 and establishes a connection therewith to send encapsulated USB messages between the USB client 140c and USB server 120 over data network 115. In the embodiment of FIG. 6, USB client 140c can associate with the multiple USB servers 120, 605, 610, although USB client 140c generally transfers data to the servers one-at-a-time, as explained below. In the system 600, the various USB servers 120, 605, 610 can function as multiple hosts for the single USB client 140c. Methods and apparatus provided in USB client 140c provide the capability of serving multiple hosts, as explained below.

Figure 7:
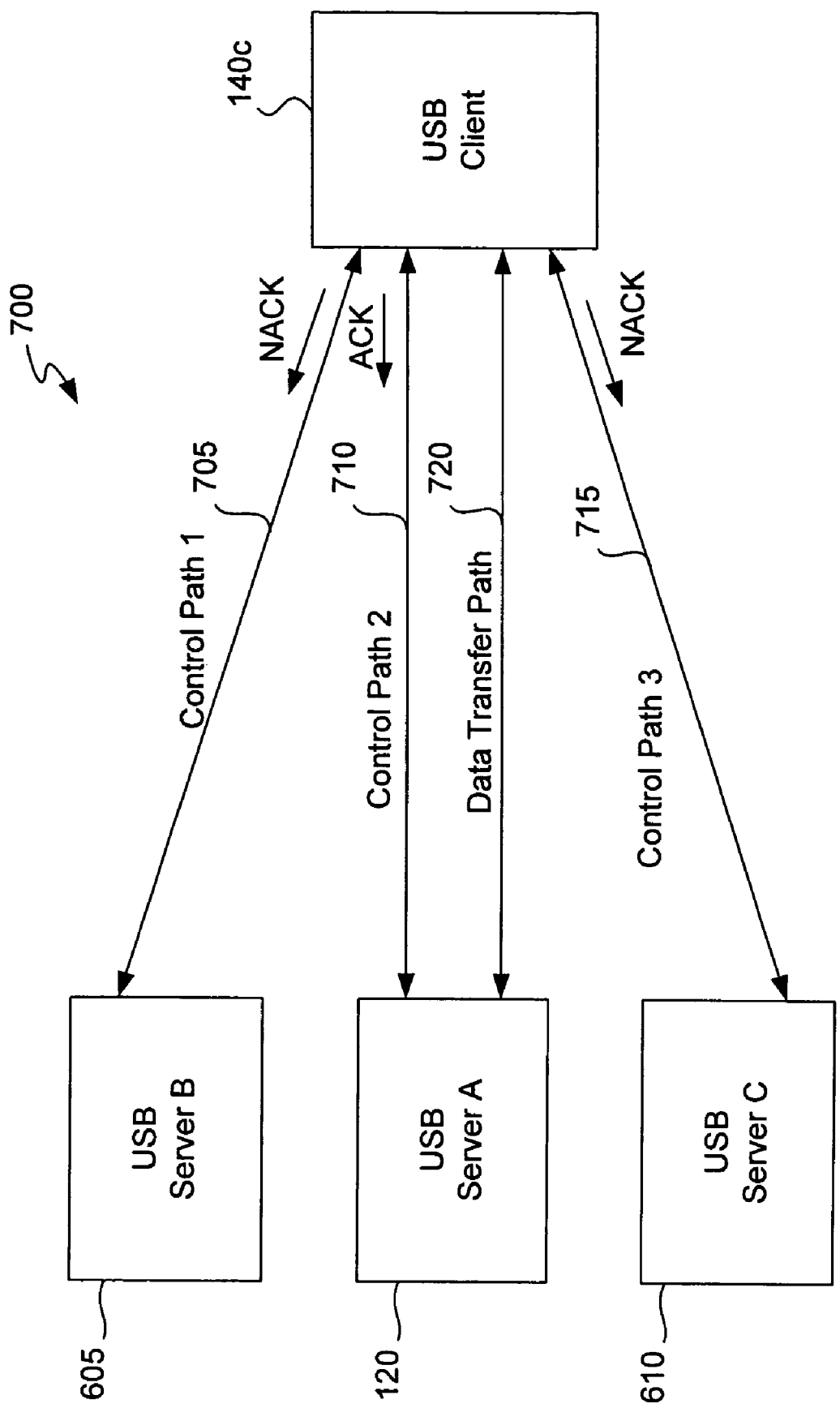
FIG. 7 shows a block diagram 700 of a plurality of USB Servers capable of interfacing with a USB client over a data network, according to one embodiment of the present invention.

FIG. 7 shows a block diagram of a system 700 in which communications paths are established between USB client 140c and the various USB servers over data network 115. In one embodiment, the communications paths include control paths 705, 710, 715 established between USB client 140c and the respective USB servers 120, 605, 610. The communications paths further include a data transfer path 720 which can be established between USB client 140c and USB server 120. Data transfer paths can also be established between USB client 140c and the other USB servers 605, 610. Those skilled in the art should appreciate that the various paths shown in FIG. 7 can be established independent of one another, and at various times during the sending and receiving of messages, as desired for the particular implementation. Generally, data transfer paths are established between USB client 140c and one USB server at a time, as explained below. Those skilled in the art should also appreciate that the various control paths and data transfer path shown in FIG. 7 can be combined or further divided as desired, depending on the particular implementation.

In one embodiment, described with reference to FIG. 7, the functionalities of the various control paths and data transfer path are provided by the USB protocol. Generally, using the USB protocol, network traffic can be segmented into three categories. The first provides for USB connection and enumeration commands, such as device discovery information including information indicating whether a device is present, the type of the device, and the status of the device, e.g., connected or disconnected. The second provides for data control messages such as NACK and STALL that provide feedback to hosts such as the USB servers when a receiving device such as USB client 140c cannot receive or handle a command or other message sent to the receiving device. The third category includes data messages that contain the content sent to or from the device. Under the USB protocol, generally the data control messages on a path separate from the data path or data transfer path. In FIG. 7, for purposes of simplification, the control paths 705, 710, 715 provide receiving and sending of the first two categories of USB messages, that is, USB connection and enumeration commands, as well as data control messages such as NACK and ACK over the appropriate endpoints. The data transfer path 720 provides sending and receiving of data such as the network messages described herein. In one embodiment, different network characteristics are applied to each of the paths. For example, a data control message can have higher network priority than bulk datagrams.

In FIG. 7, generally when USB client 140c boots up or is otherwise enabled, the USB client 140c searches for and associates with one of the USB servers 120, 605, 610. When the association is made, control messages are sent between the USB server and USB client over the control path between the two devices. Data, such as a network message containing an encapsulated USB message, is sent over data transfer path 720. The network messages are generally packetized in a suitable format or protocol for sending over the data network 115 between the associated USB client 140c and USB server 120. When USB client 140c establishes a data transfer path with one of the USB servers, in FIG. 7, USB server 120, the other USB servers 605, 610 must generally wait until USB client 140c terminates data transfer path 720 and then establishes a data transfer path with one of the other servers 120, 610.

Figure 8:
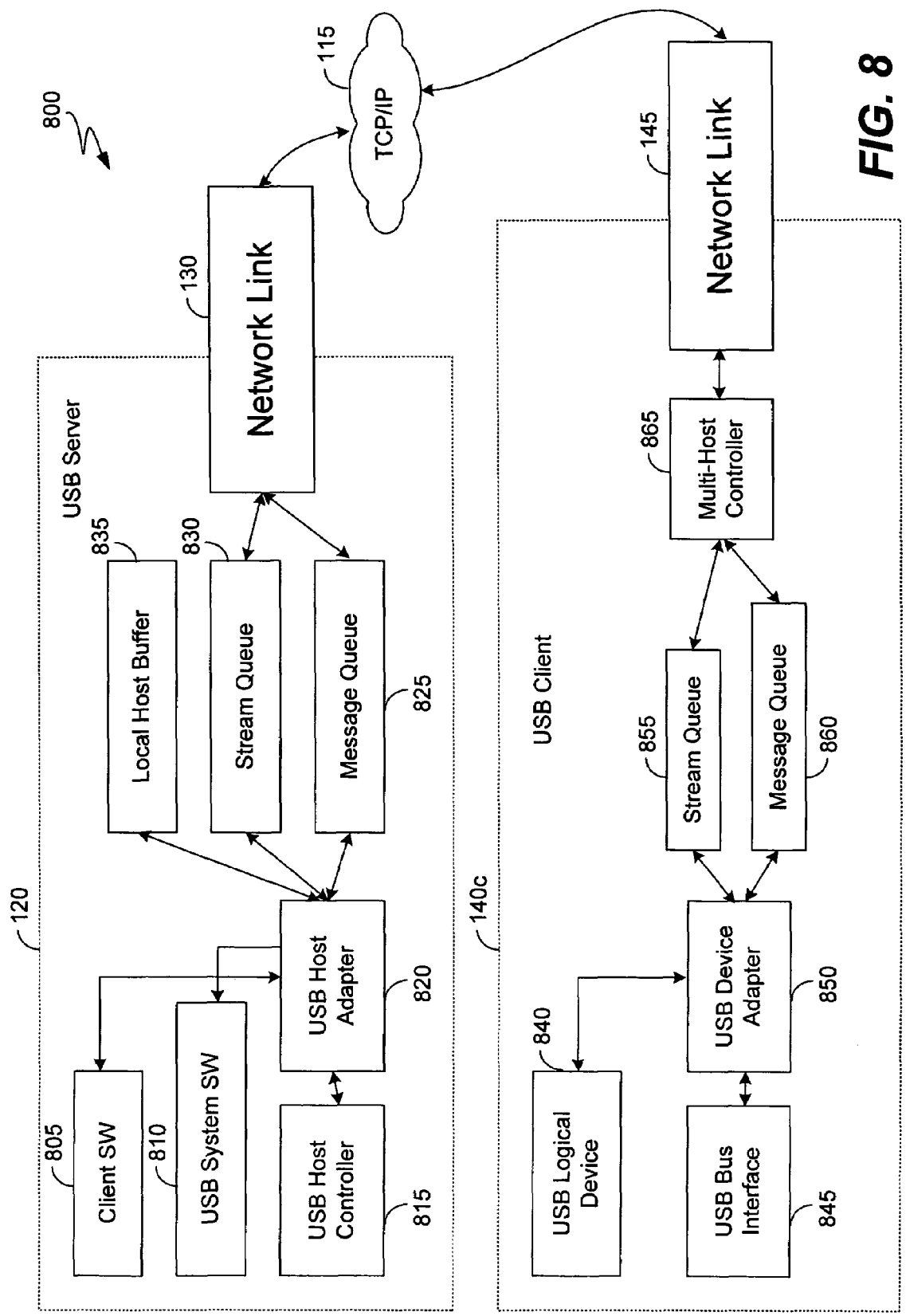
FIG. 8 shows a block diagram of apparatus 800 for controlling sending and receiving of USB messages over a data network, according to one embodiment of the present invention.

FIG. 8 shows a block diagram 800 of a system for controlling sending and receiving of USB messages over data network 115, using USB server 120 and USB client 140c. The USB server 120 is associated with a host computer such as host computer 105 of FIG. 1. The USB client 140c is associated with a USB device 110, as shown in FIG. 1. In FIG. 8, USB server 120 includes a client SW 805 an USB system SW 810, provided as standard USB architecture. The functionality of modules 805 and 810 and other USB architecture is described in the Universal Serial Bus Specification, Revision 2.0, Apr. 27, 2000, incorporated herein by reference in its entirety.

In FIG. 8, USB server 120 includes a USB host controller 815 which interfaces with any and all USB device drivers on host computer 105 serviced by USB server 120. The USB host adapter 820 is configured to receive network messages from the data network, receive USB messages from the host computer, and translate between USB protocol and network protocol as described above in methods 400 and 500 to pass the various messages to their destinations. In one embodiment, USB host adapter 820 is divided into a receiving part which is configured to receive USB messages and network messages, and a translating part configured to translate messages from one protocol to another. The USB host adapter 820 is further configured to send network messages over the data network to USB client 140c for subsequent translation back to USB protocol for the connected USB device 110.

In FIG. 8, a message queue 825 situated in USB server 120 interfaces with control path 710 of FIG. 7 to provide a buffer for sending control messages, e.g., "ACK," "NACK," and "PING," as described in the USB 2.0 specification. In FIG. 8, a stream queue 830 provides a buffer and interface with data transfer path 720 in FIG. 7 for streaming data such as network messages to and from data network 115 for later translation to a USB protocol for host computer 105 or USB device 110. Those skilled in the art should appreciate that different types of streaming can be set up and enabled through stream queue 830 depending on the desired type of data transfer between USB server 120 and USB client 140c over data network 115, e.g., bulk, isochronous, etc. The stream queue 830 and message queue 825 can be used to adjust for network jitter during a USB transmission. In one implementation, two separate TCP/IP sockets are provided by network connection 130 between USB server 120 and data network 115. One TCP/IP socket is provided for message queue 825 to send data over control path 710, of FIG. 7. The second TCP/IP socket is used for stream queue 830 to send data over data transfer path 720.

In USB server 120 of FIG. 8, local host buffer 835 provides an optional memory buffer to be used on USB server 120 to cache data during data transfer or when waiting for a remote device such as USB client 140c to be ready to receive data over data transfer path 720.

In FIG. 8, USB client 140c includes a USB logical device 840 and USB bus interface 845, provided as part of the standard USB architecture, as described in the USB 2.0 specification. In addition, USB client 140c includes USB device adapter 850 which provides the translation of USB messages to network messages and vice versa, as explained above in methods 400 and 500. A stream queue 855 and message queue 860 are also provided in USB client device 140. The stream queue 855 and message queue 860 provide essentially the same functions as the counterpart stream queue 830 and message queue 825 in USB server 120. In USB client 140c, a multi-host controller 865 manages network traffic to and from USB client 140c. That is, multi-host controller 865 signals to connected hosts such as USB server 120 and other USB servers 605 and 610 the current status of USB device 110. Multi-host controller 865 manages the establishing and termination of communications paths with the respective USB servers over data network 115, as illustrated in FIG. 7 and explained below. In one embodiment, multi-host controller 865 maintains a table of TCP port and remote host IP addresses, as well as an indication of which host or USB server is "active" so that any request message from other "inactive" hosts is sent a "busy" message such as a NACK or PING, as provided by the USB protocol. In addition, multi-host controller 865 acts as a host for USB device 110 and controls the physical initialization of device 110.

The system 800 shown in FIG. 8 provides "spoofing" components in the form of USB host adapter 820 and USB device adapter 850. USB host adapter 820 interfaces and interacts with host computer 105 in a manner that host computer 105 would be connected and engaged with a conventional USB hub. That is, USB host adapter 820 responds to and sends signals to host computer 105 over USB port 125, at times mimicking a USB hub, as if USB device 110 was connected directly to the USB hub or the USB server 120. Similarly, USB device adapter 850 in USB client 140c interact with USB device 110 as if USB device 110 was interacting with the output of a USB hub or USB port connected to host computer 105. Thus, no additional driver software or other functions are required to be implemented in USB device 110 and host computer 105 to interact with USB server 120 and associated USB clients and attain the benefits provided by the USB server and USB client pair.

Figure 9:
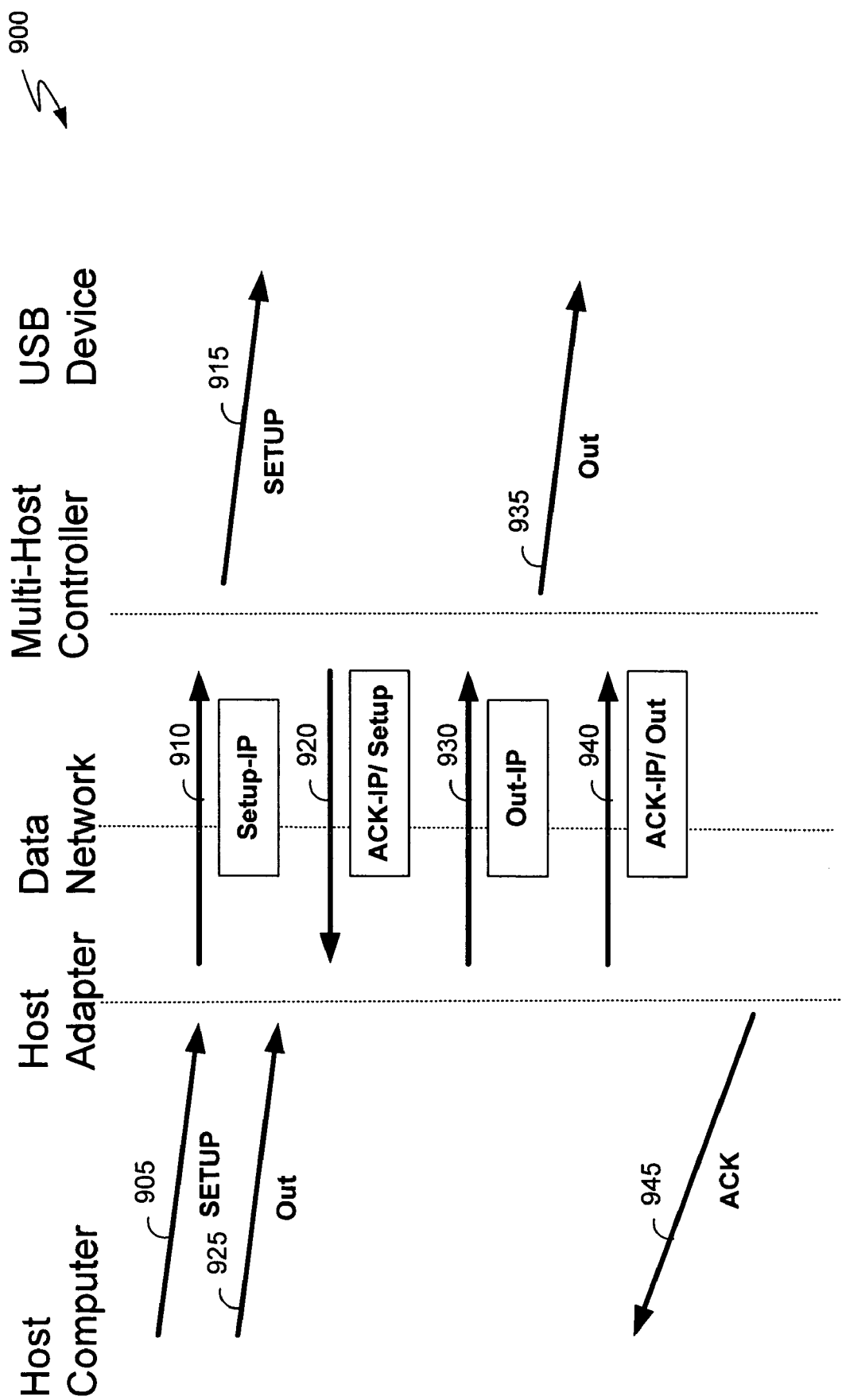
FIG. 9 shows flow diagram of a method 900 for controlling the sending and receiving of USB messages between a host computer and a USB device over a data network, according to one embodiment of the present invention.

FIG. 9 shows a method 900 for controlling the sending and receiving of USB messages between host computer 105 and USB device 110 over data network 115. The method 900 is described with reference to FIGS. 1 and 7. In Step 905, host computer 105 sends a "SETUP" message to host adapter 820 in USB server 120. When the SETUP message is received by host adapter 820, in Step 910, host adapter 820 sends a "SETUP-IP" as a request message to multi-host controller 865 and USB client 140c. A control path is established between host adapter 820 and multi-host controller 865 for sending control messages such as the SETUP-IP message. The control path can be established before or after the SETUP-IP message is sent, depending on the desired implementation. Those skilled in the art will appreciate that, when the control path has not yet been established, the SETUP-IP message is sent over an alternative communications path over data network 115 between the USB server 120 and USB client 140c.

In FIG. 9, in Step 915, multi-host controller 865 passes a SETUP message to USB device 110. In this example, USB device 110 is available to receive data, so in step 920, multi-host controller 865 sends an acknowledge message such as "ACK-IP/SETUP" back to host adapter 820. The data transfer path 720 is then established between USB server 120 and USB client 140c. In an alternative embodiment, data transfer path 720 has already been established. In Step 925, an "OUT" message including data in a USB protocol is sent from host computer 105 to host adapter 820. USB host adapter 820 encapsulates the USB message in a format suitable for sending over data network 115, and sends the encapsulated message as a network message or "OUT-IP" message in Step 930 to multi-host controller 865 in USB client 140c. In Step 935, the network message is translated back to USB protocol by USB device adapter 850 and passed on to USB device 110. In Step 940, when the data transfer is successful over the data transfer path 720, the multi-host controller 865 sends an acknowledge message such as "ACK-IP/OUT" back to host adapter 820 and USB server 120. In Step 945, an acknowledge or "ACK" message is accordingly provided to host computer 105.

Figure 10A:
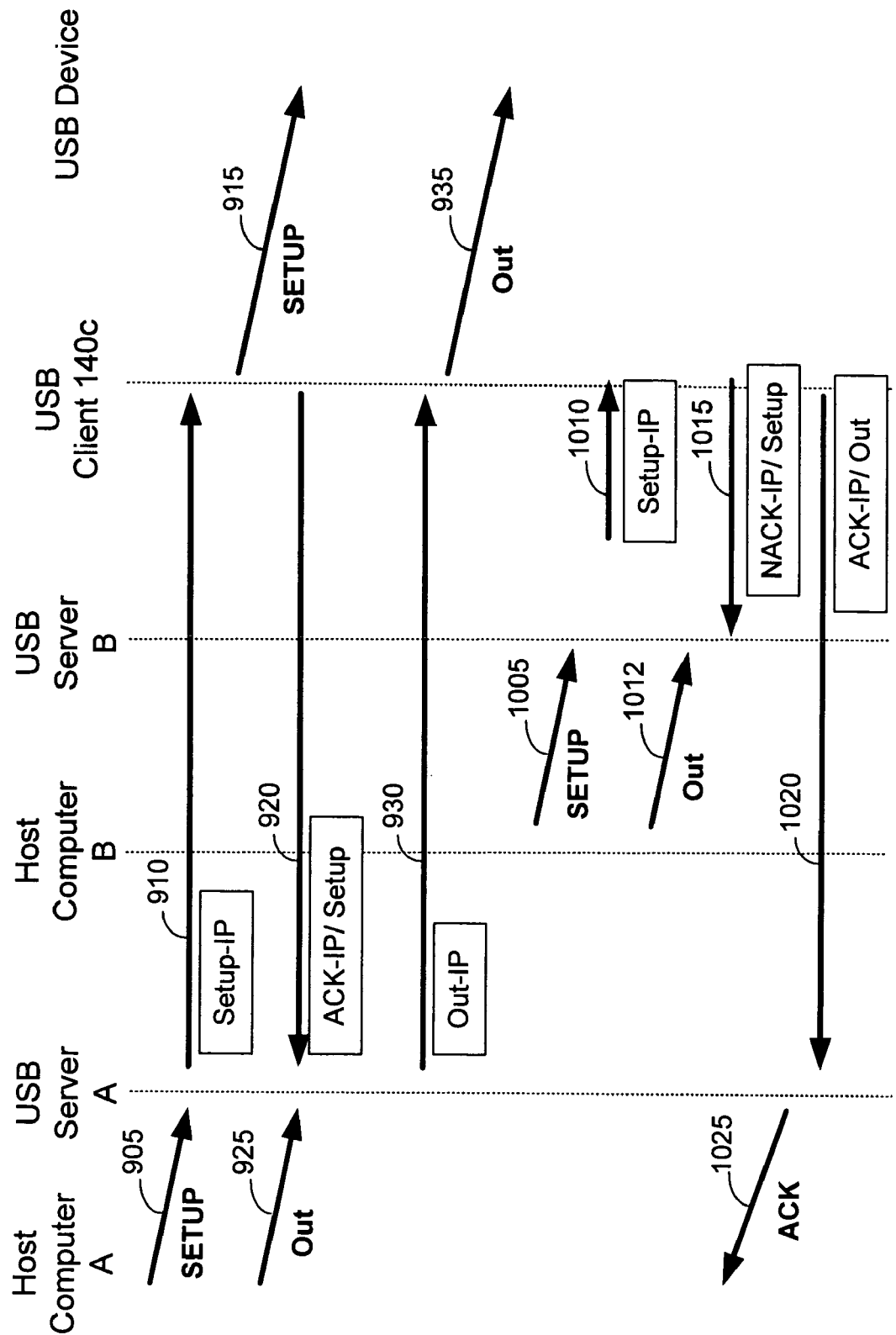

FIGS. 10A and 10B show a method for controlling sending and receiving of USB messages between a plurality of host computers and a single USB device 110 over data network 115, performed in accordance with one embodiment of the present invention. In this example, as shown in FIG. 7, a first control path 705 is established between USB client 140c and USB server 120 ("USB server A"). A second control path 710 is established between USB client 140c and USB server 605 ("USB server B"). As mentioned above, these control paths 705, 710 can be established at the outset of processing, or during processing as needed to send control messages between the various devices. In FIG. 10A, Steps 905-935, as described above with respect to FIG. 9, are performed between USB server 120 with associated host computer 105 and USB client 140c with associated USB device 110.

In FIG. 10A, when the data transfer path is still established between USB server A and USB client 140c, in Step 1005, a host computer B associated with USB server B sends a "SETUP" message to USB server B. USB server B, in Step 1010, then sends a request or "SETUP-IP" message to multi-host controller 865. Because the data transfer path 720 is still established with USB server A, in Step 1015, multi-host controller 865 sends a busy message back to USB server B, indicating that USB client 140c is not yet available to establish a data transfer path or otherwise receive data from USB server B on behalf of host computer B. In one embodiment, this busy message is in the form of a "NACK-IP/setup" message, provided by both the USB 1.1 and 2.0 protocols. Another suitable busy message is a "PING" message provided by the PING function of the USB 2.0 protocol for sending data to high speed devices.

In FIG. 10A, when data transfer has been completed between USB server A and USB client 140c, a complete message or other suitable acknowledge message, such as "ACK-IP/Out" is sent by multi-host controller 865 back to USB host adapter 820 in USB server A, in Step 1020. This complete message can then be passed, in Step 1025, to host computer A as an "ACK" message. The USB host adapter 820 in USB server 120 can then terminate the data transfer path 720 established between USB server A and USB client 140c, responsive to this complete message.

In FIG. 10B, in another embodiment, a complete message 1030 is sent from host computer A to USB server A, when data transfer is complete. The USB server A sends a "complete-IP" message or other suitable message to multi-host controller 865 in USB client 140c, in Step 1035, indicating that the data transfer is complete. This complete message can then be passed to USB device 110 in Step 1040. A further complete message, such as "ACK-IP/complete" can then be sent from multi-host controller 865 to host adapter 820 in Step 1045. Responsive to any of the various complete messages sent in Steps 1030-1045, the data transfer path 720 between USB server A and USB client 140c is then terminated.

In FIG. 10B, when data transfer path 720 has been terminated, USB client 140c is available to establish a data transfer path with another one of the USB servers 120, 605, 610 in FIG. 7. In one embodiment, shown in FIG. 10B, an acknowledge message, such as "ACK-IP/setup" message 1055 is sent from multi-host controller 865 back to USB server B, which received the busy message in Step 1015. Then, Steps 1060-1090 can be performed between host computer B, USB server B, multi-host controller 865, and USB device 110, identical to Steps 930, 935, and 1030-1050 between host computer A, USB server A, USB client 140c, and USB device 110, described above. Again, when the data transfer path is established between USB client 140c and USB server B, requests for data transfer or for the establishing of data transfer paths from any of the other USB servers will be replied to with a busy message such as a "NACK" or "PING" message, as shown in FIG. 7. Thus, USB client 140c acts as a gatekeeper for USB device 110 by providing for data transfer with one host at a time. Those skilled in the art should appreciate that interleaving transfers will be applicable for some devices, but not all. With some devices and host computer class drivers, data transfer will involve transaction interleaving (set of multi-transfers, rather than USB interleaving). In other instances, there will be no interleaving.

Figure 11:
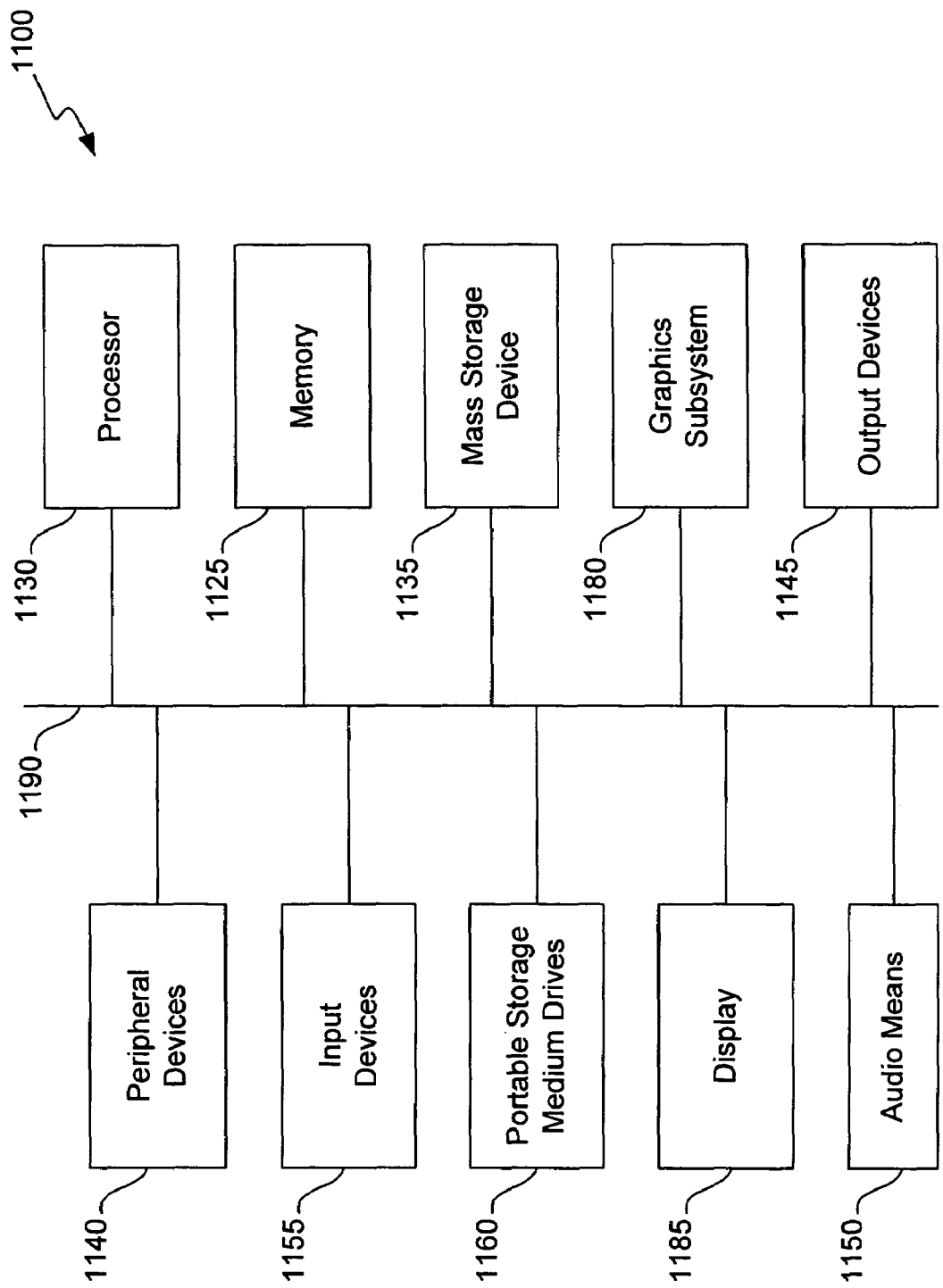
FIG. 11 shows a block diagram of a data processing apparatus 1100 such as host computer 105, used in accordance with embodiments of the present invention.

FIG. 11 is a block diagram of a host computer 105 or other data processing apparatus 1100 used as described herein. The computer system 1100 includes a processor 1130 for executing program instructions stored in a memory 1125. In some embodiments, processor 1130 includes a single microprocessor, while in others, processor 1130 includes a plurality of microprocessors to define a multi-processor system. In some embodiments, the memory 1125 stores instructions and data for execution by processor 1130, including instructions and data for performing the methods described above. Depending on the extent of software implementation in computer system 1100, the memory 1125 stores executable code when in operation. The memory 1125 includes, for example, banks of read-only memory (ROM), dynamic random access memory (DRAM) as well as high-speed cache memory.

In FIG. 11, within computer system 1100, an operating system comprises program instruction sequences. The operating system provides a software platform upon which application programs may execute, in a manner readily understood by those skilled in the art. In some embodiments, the computer system 1100 further comprises one or more applications having program instruction sequences for performing the methods described above.

In FIG. 11, the computer system 1100 incorporates any combination of additional devices. These include, but are not limited to, a mass storage device 1135, one or more peripheral devices 1140, an audio means 1150, one or more input devices 1155, one or more portable storage medium drives 1160, a graphics subsystem 1180, a display 1185, and one or more output devices 1145. The various components are connected via an appropriate bus 1190 as known by those skilled in the art. In alternative embodiments, the components are connected through other communications media known in the art. In one example, processor 1130 and memory 1125 are connected via a local microprocessor bus; while mass storage device 1135, peripheral devices 1140, portable storage medium drives 1160, and graphics subsystem 1180 are connected via one or more input/output buses.

In FIG. 11, mass storage device 1135 is implemented as fixed and/or removable media, for example, as a magnetic, optical, or magneto-optical disk drive. The drive is preferably a non-volatile storage device for storing data and instructions for use by processor 1130. In some embodiments, mass storage device 1135 stores client and server information, code for carrying out methods in accordance with exemplary embodiments of the invention, and computer instructions for processor 1130. In other embodiments, computer instructions for performing methods in accordance with exemplary embodiments of the invention also are stored in processor 1130. The computer instructions are programmed in a suitable language such as Java or C++.

In FIG. 11, the portable storage medium drive 1160, in some embodiments, operates in conjunction with a portable non-volatile storage medium, such as a floppy disk, CD-ROM, or other computer-readable medium, to input and output data and code to and from the computer system 1100. In some embodiments, methods performed in accordance with exemplary embodiments of the invention are implemented using computer instructions that are stored on such a portable medium and input to the computer system 1100 via portable storage medium drive 1160.

In FIG. 11, the peripheral devices 1140 include any type of computer support device, such as an input/output (I/O) interface, to add functionality to computer system 1100. In one example, the peripheral devices include a network interface card for interfacing to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 11, the graphics subsystem 1180 and the display 1185 provide output alternatives of the system. The graphics subsystem 1180 and display 1185 include conventional circuitry for operating upon and outputting data to be displayed, where such circuitry preferably includes a graphics processor, a frame buffer, and display driving circuitry. The display 1185 may include a cathode ray tube (CRT) display, a liquid crystal display (LCD), or other suitable devices. The display 1185 preferably can display at least 256 colors. The graphics subsystem 1180 receives textual and graphical information and processes the information for output to the display 1185, often as a GUI. A video card in the computer system 1100 also comprises a part of graphics subsystem 1180 and also preferably supports at least 256 colors. For optimal results in viewing digital images, the user should use a video card and monitor that can display the True Color (24 bit color) setting. This setting enables the user to view digital images with photographic image quality.

In FIG. 11, audio means 1150 preferably includes a sound card that receives audio signals from a peripheral microphone. In addition, audio means 1150 may include a processor for processing sound. The signals can be processed by the processor in audio means 1150 of computer system 1100 and passed to other devices as, for example, streaming audio signals.

In some embodiments, programs for performing methods in accordance with exemplary embodiments of the invention are embodied as computer program products. These generally include a storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network. Suitable networks include the Internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

Embodiments of the invention, including the methods, apparatus, modules, adaptors, controllers, and functions described herein, can be implemented in digital electronic circuitry, or in computer hardware, firmware, software, or in combinations of them. For example, the USB server 120 can be constructed to include a processor, memory, and appropriate software for performing the methods and functions described above. The same is true for any of the USB clients. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A method for controlling sending and receiving of universal serial bus ("USB") messages between a plurality of host computers and a USB device over an Ethernet data network, a first USB server in communication with a first one of the host computers and the Ethernet data network, a second USB server in communication with a second one of the host computers and the Ethernet data network, a USB client in communication with the Ethernet data network and the USB device, the method comprising the steps of:

establishing a first control path between the USB client and the first USB server and a second control path between the USB client and the second USB server;

configuring an association module in the USB client with a first association between the USB client and the first USB server and a second association between the USB client and the second USB server;

establishing a first data transfer path between the USB client and the first USB server, the first data transfer path enabling sending of data between the USB client and the first USB server over the Ethernet data network; and sending a busy message from the USB client to the second USB server over the second control path when the first data transfer path is established with the first USB server.

2. The method of claim 1, wherein the step of establishing the first data transfer path between the USB client and the first USB server includes:

sending a request message from the first USB server to the USB client over the first control path.

3. The method of claim 1, wherein the step of establishing the first data transfer path between the USB client and the first USB server includes:

sending an acknowledge message from the USB client to the first USB server over the first control path.

4. The method of claim 1, further comprising the step of:

sending a request message from the second USB server to the USB client over the second control path, the busy message being sent responsive to the request message.

5. The method of claim 1, further comprising the steps of:

terminating the first data transfer path; and establishing a second data transfer path between the USB client and the second USB server, the second data transfer path enabling sending of data between the USB client and the second USB server over the data network.

6. The method of claim 5, wherein the step of terminating the first data transfer path includes:

sending a complete message from the USB client to the first USB server over the first control path.

7. The method of claim 5, wherein the step of terminating the first data transfer path includes:

sending a complete message from the first USB server to the USB client over the first control path.

8. The method of claim 5, wherein the step of establishing the second data transfer path between the USB client and the second USB server includes:

sending an acknowledge message from the USB client to the second USB server over the second control path.

9. The method of claim 5, further comprising the step of:

sending the busy message from the USB client to the first USB server over the first control path when the second data transfer path is established with the second USB server.

10. The method of claim 5, further comprising the step of:

sending the busy message from the USB client to a third USB server over a third control path established between the USB client and the third USB server when the second data transfer path is established with the second USB server, the third USB server in communication with a third one of the host computers and the data network.

11. The method of claim 1, wherein the USB client is connected to a single USB device.

12. The method of claim 1, further comprising:

finding a first USB server and a second USB server with which the USB client should associate.

13. The method of claim 12, wherein the finding includes:

broadcasting to find the nearest USB server.

14. The method of claim 12, wherein the finding includes:

retrieving stored data identifying a particular USB server with which the USB client should associate.

15. The method of claim 12, wherein the finding includes:

receiving an identification of a USB server from a user in response to presenting the user with a user interface allowing selection of the USB server.

16. The method of claim 12, wherein the finding includes:
receiving a selection of a USB server from a user through hardware settings.

17. A computer program product, stored on a processor readable medium, comprising instructions operable to cause a data processing apparatus to perform a method for controlling sending and receiving of universal serial bus ("USB") messages between a plurality of host computers and a USB device over an Ethernet data network, a first USB server in communication with a first one of the host computers and the Ethernet data network, a second USB server in communication with a second one of the host computers and the Ethernet data network, a USB client in communication with the Ethernet data network and the USB device, the method comprising the steps of:
establishing a first control path between the USB client and the first USB server and a second control path between the USB client and the second USB server;
configuring an association module in the USB client with a first association between the USB client and the first USB server and a second association between the USB client and the second USB server;
establishing a first data transfer path between the USB client and the first USB server, the first data transfer path enabling sending of data between the USB client and the first USB server over the Ethernet data network; and
sending a busy message from the USB client to the second USB server over the second control path when the first data transfer path is established with the first USB server.

18. The computer program product of claim 17, wherein the USB client is connected to a single USB device.

19. A system for controlling sending and receiving of universal serial bus ("USB") messages between a plurality of host computers and a USB device over a data network, the system comprising:
a data network that comprises at least one of the Internet, an intranet, an extranet, a local area network, a wide area network, or a combination thereof;
a first USB server in communication with the data network and a first one of the host computers, the first USB server having a first network address on the data network;
a second USB server in communication with the data network and a second one of the host computers, the second USB server having a second network address on the data network; and
a USB client in communication with the data network and the USB device, the USB client configured to:
i) establish communications paths with the first and second USB servers,
ii) configure an association module in the USB client with a first association between the USB client and the first USB server and a second association between the USB client and the second USB server;
iii) establish a data transfer path with the first USB server, the data transfer path enabling passing data between the USB client and the first USB server over the data network, and
iv) send a busy message to the second USB server over the communications path established with the second USB server when the data transfer path is established with the first USB server.

20. The system of claim 19, wherein the USB client sends the busy message to the second computer responsive to a request message received from the second computer over the communications path established with the second computer.

21. The system of claim 19, the USB client further configured to:
iv) receive a USB message from the USB device, and
v) translate the USB message to a network format suitable for sending over the data network.

22. The system of claim 21, wherein translating the USB message to the network format includes encapsulating the USB message in a network protocol.

23. The system of claim 21, the USB client further configured to:
vi) send the translated USB message as a network message to the first USB server over the data transfer path.

24. The system of claim 19, the USB client further configured to:
iv) receive a network message from the first USB server over the data transfer path,
v) translate the network message to a USB format, and
vi) provide the translated network message as a USB message for the USB device.

25. The system of claim 19, wherein the data network includes an Internet.

26. The system of claim 19, wherein the data network includes a wireless network.

27. The system of claim 19, wherein the USB client is connected to a single USB device.

28. A system for controlling sending and receiving of universal serial bus ("USB") messages between a plurality of host computers and a USB device over an Ethernet data network, the system comprising:
first USB server means in communication with the data network and a first one of the host computers, the first USB server means having a first network address on the Ethernet data network;
second USB server means in communication with the data network and a second one of the host computers, the second USB server means having a second network address on the Ethernet data network; and
a USB client in communication with the data network and the USB device, the USB client including:
i) means for establishing communications paths with the first and second USB server means,
ii) means for configuring an association module in the USB client with a first association between the USB client and the first USB server and a second association between the USB client and the second USB server;
iii) means for establishing a data transfer path with the first USB server means, the data transfer path enabling passing data between the USB client and the first USB server means over the data network, and
iv) means for sending a busy message to the second USB server means over the communications path established with the second USB server means when the data transfer path is established with the first USB server means.

29. The system of claim 28, wherein the USB client is connected to a single USB device.

30. A USB client apparatus for controlling sending and receiving of universal serial bus ("USB") messages between a plurality of host computers and an associated client device over a data network, each host computer having an associated USB server in communication with the data network, the USB client apparatus comprising:
a multi-host controller in communication with the data network, the multi-host controller configured to:
i) establish communications paths with the USB servers, ii) configure an association module in the USB client with a first association between the USB client and the first USB server and a second association between the USB client and the second USB server;

iii) establish a data transfer path with a first one of the USB servers, the data transfer path enabling the sending of data between the USB client and the first USB server over a data network, the data network consisting of the Internet, an intranet, an extranet, a local area network, a wide area network, or a combination thereof, and iv) send a busy message to a second one of the USB servers when the data transfer path is established with the first USB server.

31. The USB client apparatus of claim 30, further comprising:

a USB device adaptor interfacing with the client device and configured to:
i) receive a USB message from the client device,
ii) translate the USB message to a network format suitable for sending over the data transfer path,
iii) receive a network message from the data network, and
iv) translate the network message to a USB format suitable for providing to the client device.

32. The USB client apparatus of claim 30, the USB client apparatus further comprising:

a stream queue configured to store stream data for sending to or receiving from the data transfer path.

33. The USB client apparatus of claim 30, the multi-host controller further configured to:

iv) send an acknowledge message to the first USB server over the communications path established with the first USB server.

34. The USB client apparatus of claim 33, the USB client apparatus further comprising:

a message queue configured to store the busy and the acknowledge messages for sending to the data network.

35. The USB client apparatus of claim 30, wherein the USB client is connected to a single USB device.

* * * * *